United States Patent [19]
Iannuccilli et al.

[11] Patent Number: 5,864,979
[45] Date of Patent: Feb. 2, 1999

[54] FISHING LURE RETRIEVER

[76] Inventors: Dominic Iannuccilli, 106 St-Francis, Châteauguay, Quebec, Canada, J6J 1Y5; Dmitri Lamer, 649 6th Avenue, Lachine, Quebec, Canada, H8S 1Y4

[21] Appl. No.: 834,703

[22] Filed: Apr. 1, 1997

Related U.S. Application Data

[60] Provisional application No. 60/014,575 Apr. 2, 1996.

[51] Int. Cl.⁶ .................................................. A01K 97/24
[52] U.S. Cl. ............................................................. 43/17.2
[58] Field of Search .................................... 43/17.2, 43.1, 43/44.9

[56] References Cited

U.S. PATENT DOCUMENTS 2,714,777  8/1955  Peak ......................................... 43/17.2
3,375,602  4/1968  Clark et al. ............................... 43/17.2

FOREIGN PATENT DOCUMENTS 787621  6/1968  Canada .................................... 43/17.2

*Primary Examiner*—Robert P. Swiatek
*Attorney, Agent, or Firm*—Swabey Ogilvy Renault

[57] ABSTRACT

A fishing lure retriever wherein the lure includes a leader connecting the lure to a fishing line. The retriever comprises a base member and a cap member fixed to the base member, the cap and base member defining a slot for receiving the fishing line and sliding on the fishing line when the line is taut. One end of the retriever has means being engaged by a retrieval cord, the other end of the retriever being open and including a latch pivotally mounted against a spring in the base. The latch is adapted to be depressed inwardly of the retriever in order to receive the fishing line, and the latch is further depressed against the spring when it engages the leader of the lure.

3 Claims, 3 Drawing Sheets

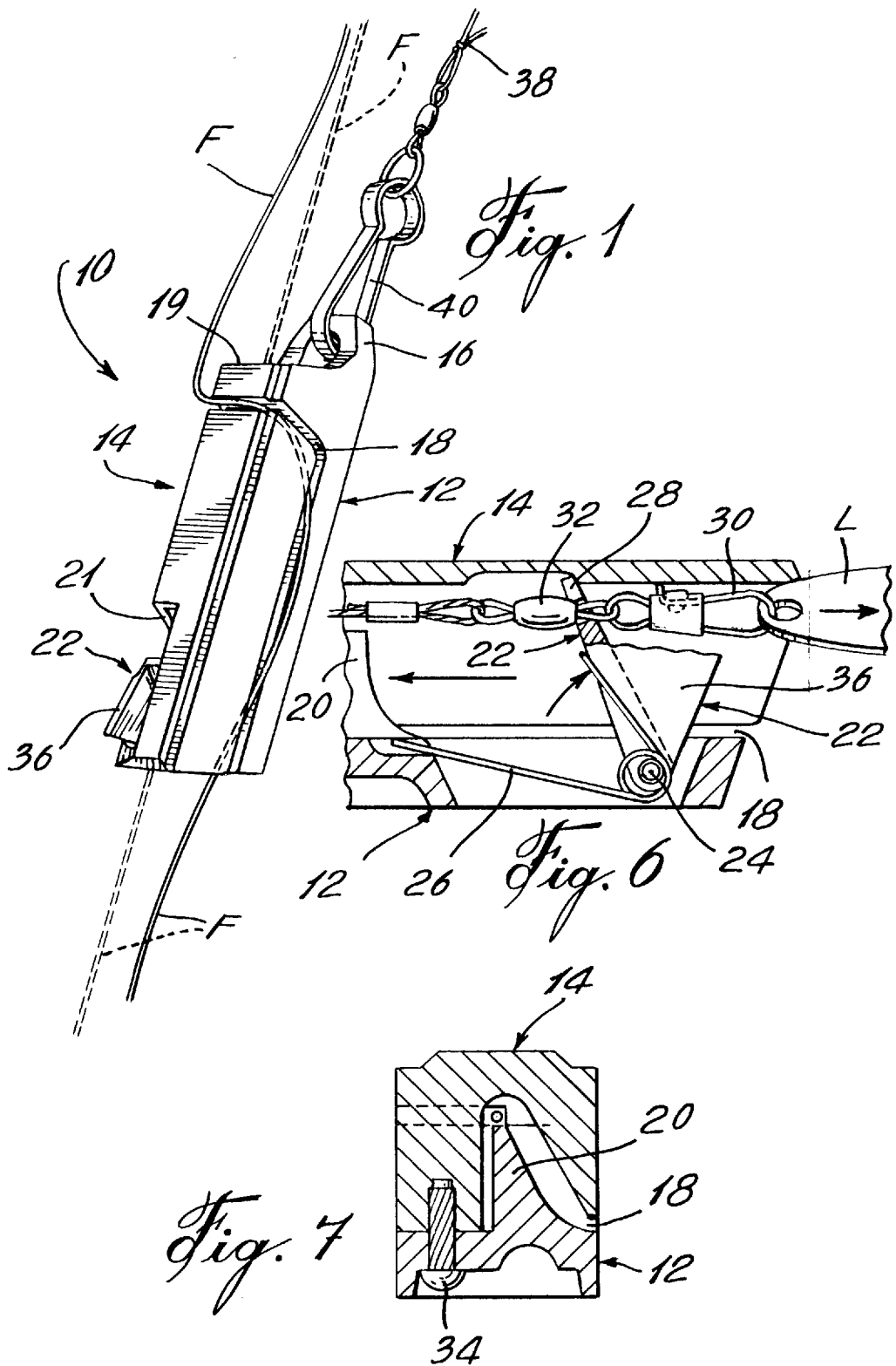

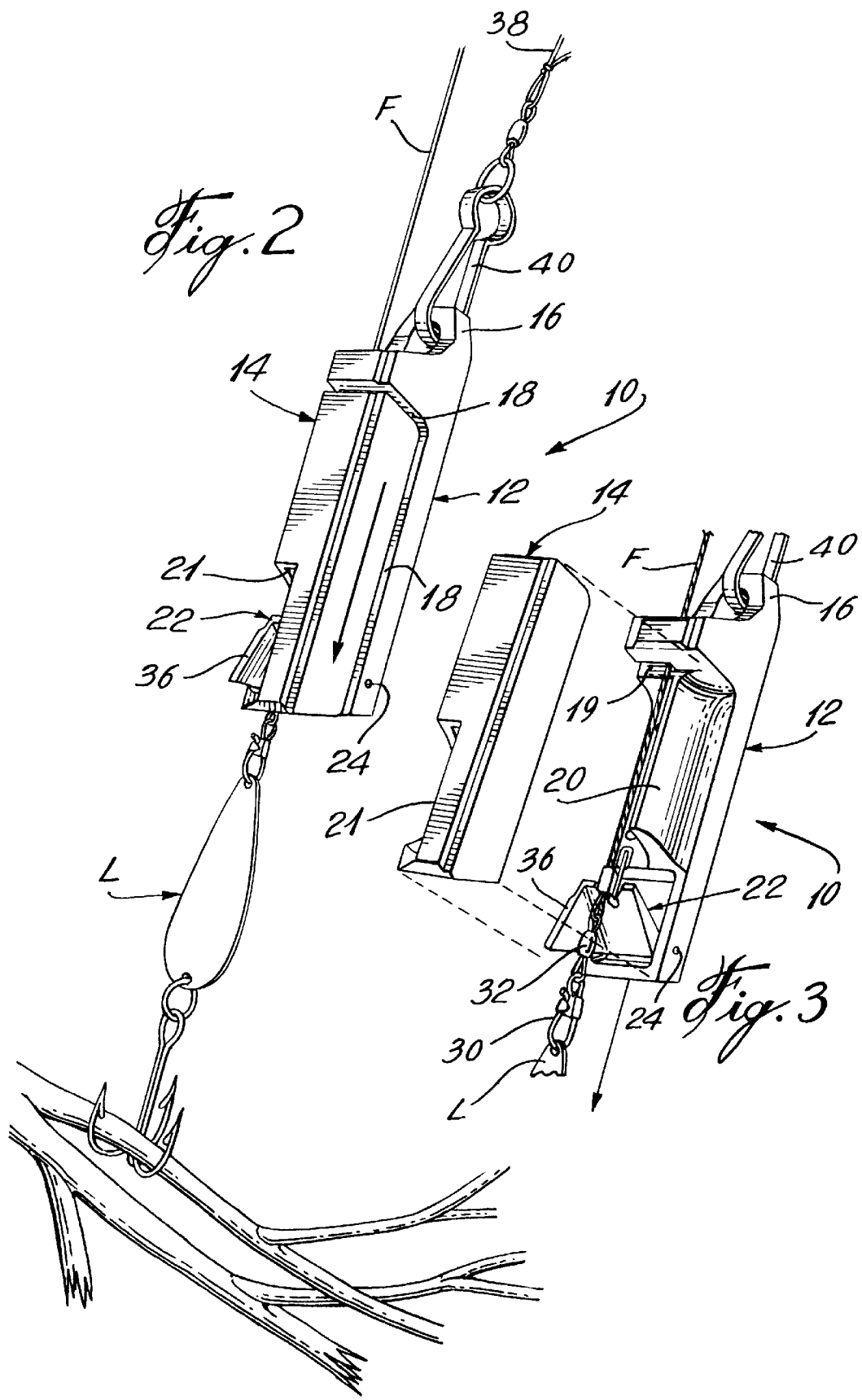

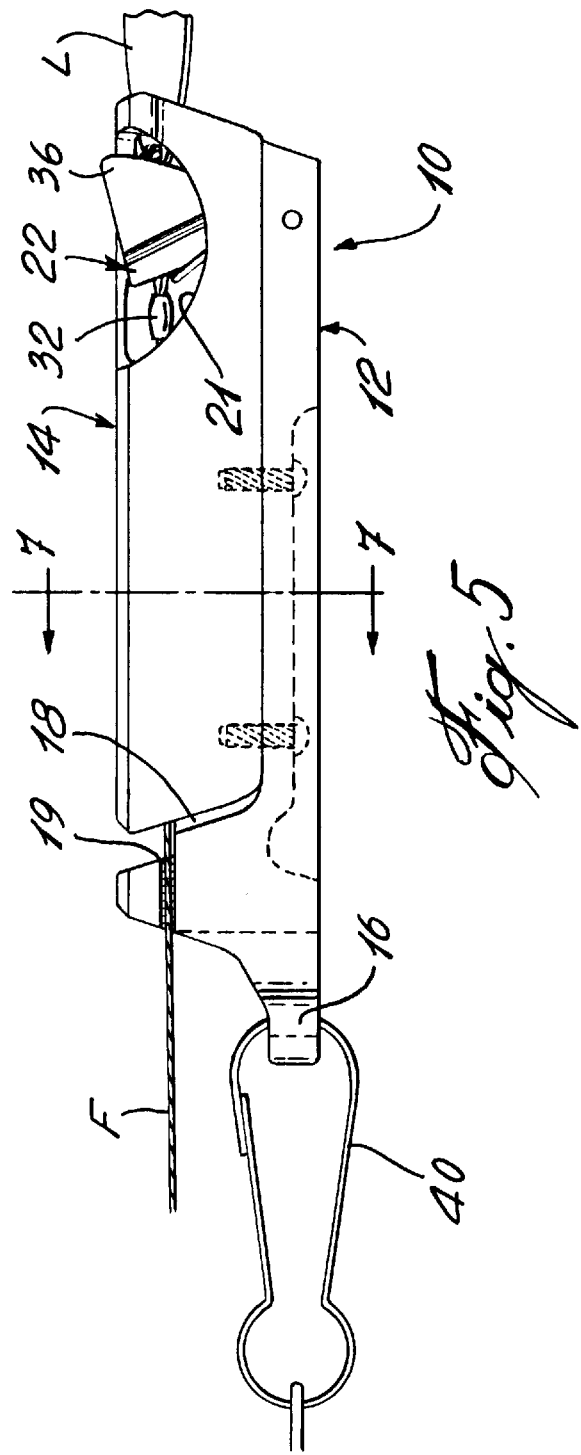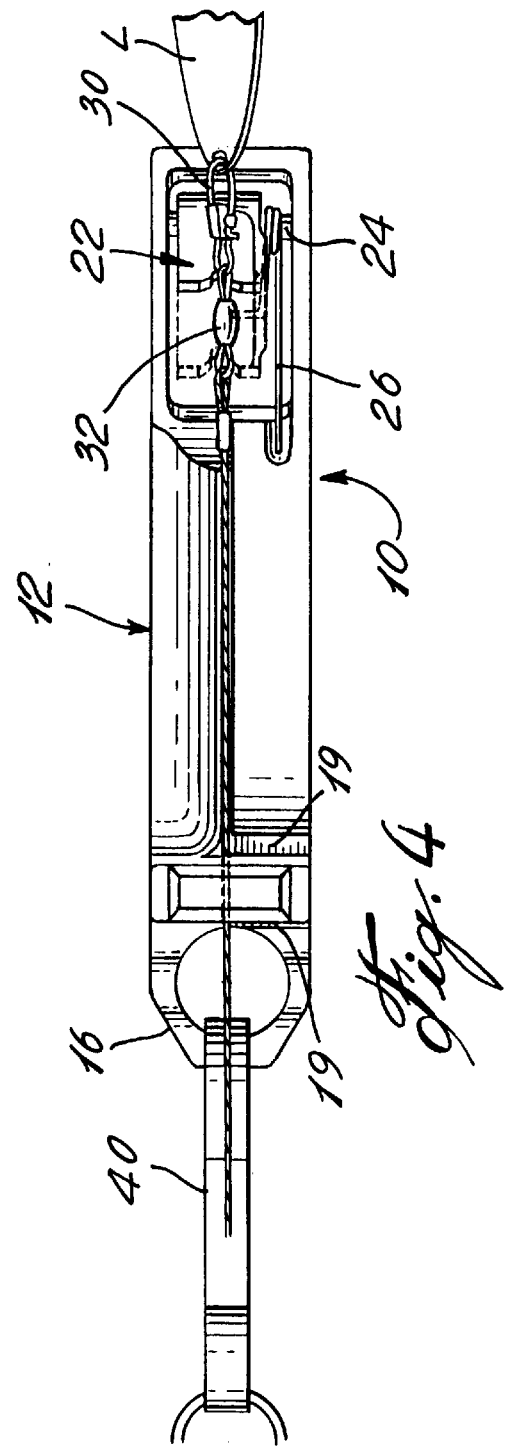

FISHING LURE RETRIEVER

This application claims the benefit of U.S. Provisional Application No. 60/014,575, filed Apr. 2, 1996.

BACKGROUND OF THE INVENTION

1. Field of the Invention

The present invention relates to a fishing lure retriever.

2. Description of the Prior Art

Fishing lure retrievers are known. The typical fishing lure retrievers include a weighted retriever device which is adapted to slide on the fishing line to engage the lure or the leader. When the retriever device has been engaged, a separate cord attached to the retriever device is pulled to forcibly disengage the lure from its entrapped position. U.S. Pat. No. 3,375,602 issued Apr. 2, 1968 to J. M. Clark et al is an example of such a device.

SUMMARY OF THE INVENTION

It is an aim of the present invention to provide an improved fishing lure retriever which is more simple to handle and more effective than existing fishing lure retrievers.

A fishing lure retriever in accordance with the present invention includes a base member and a cap member fixed to the base member, the cap and base member defining a slot for receiving and sliding on the fishing line. One end of the base member includes a loop to be engaged by a retrieval cord, the other end of the base member and cap member being opened and including a pivoting spring mounted latch adapted to be depressed when the retriever is moving towards the lure, on the fishing line, and thereby catch a leader of the lure when the retriever device is pulled in the opposite direction. A safety catch is provided for depressing the latch and mounting the retriever to the fishing line.

BRIEF DESCRIPTION OF THE DRAWINGS

FIG. 1 is a perspective view of the retriever in accordance with the present invention;

FIG. 2 is a similar perspective view showing the retriever device in an engaged position on a fishing lure;

FIG. 3 is a an exploded perspective view of the retriever device engaged on the leader of the lure;

FIG. 4 is a top plan view partly in cross-section of the retriever device shown in FIG. 1;

FIG. 5 is a side elevation thereof;

FIG. 6 is a fragmentary enlarged longitudinal cross-section thereof; and

FIG. 7 is a vertical lateral cross-section taken along line 7—7 of FIG. 5.

DESCRIPTION OF THE PREFERRED EMBODIMENTS

Referring now to the drawings the lure retriever 10 includes an elongated base member 12 and a cap 14 defining, with the base member, a slot 18. The slot 18 is best shown in FIGS. 2, 4 and 7.

The slot includes a slot portion 19 extending horizontally in the upstream part of the base and the entrapped portion between an upstanding longitudinal wall 20 extending on the base and the inner surface of the cap 14.

A pair of screws 34 fix the cap to the base 12.

A latch 22 is pivotally mounted on pivot pin 24 with spring 26 as shown in FIG. 6. The latch 22 includes a detent portion or safety catch 36. The latch 22 includes a V-shaped recess 28 on the top edge thereof to receive the line F. There is an opening 21 in the cap 14 to allow the safety catch 36 to protrude from the assembly.

In operation, the snap hook 40 is clipped to the loop 16 at the upstream end of the base 12. The snap hook 40 is attached to the retriever cord 78. The retriever 10 then engages onto a fishing line F by passing the fishing line into the slot 19 and slot 18 along the length of the retriever 10. The fishing line F is then passed over the latch 22 when depressed by the operator who depresses the safety catch 36. When the fishing line F is aligned in the V-shaped recess 28, the safety catch 36 is released and the spring 26 will move the latch 22 upwardly to abut against the top wall of the cap 14. The fishing line F is then held tight while the retriever 10 is allowed to slide down the fishing line towards the lure.

The retriever 10 is relatively massive and made of cast zinc or other metal to provide sufficient weight to allow the retriever 10 to slide easily down the fishing line F in the water. The cord 38 is left loose. When the retriever 10 reaches the lure L the weight of the retriever 10 will force the latch 22 to pivot about the pivot pin 24 as it abuts onto the leader 32. When the retriever 10 reaches the lure L it is prevented from moving further. The retriever cord 38 is then made taut and the latch 22 will anchor onto the leader 32. The retriever cord 38 is then pulled and the lure L will give and then can be pulled up towards the operator.

We claim:

1. A fishing lure retriever wherein the lure includes a leader connecting the lure to a fishing line, the retriever comprising an elongated base member having a longitudinal axis and of relatively large mass, the base member including a front end, a rear end, and a pair of opposed first and second side wall surfaces, a base interface surface extending from a distance behind the front end to the rear end and between said first and second side surfaces, the base member including an integral mound portion projecting above the interface surface and forward thereof to define a mound rear wall at an outward angle to the interface surface, a first slot defined in the mound open to the first side wall and to the front end as well as the rear end of the mound and parallel and spaced from the base interface surface, a cap member extending the full length of the base interface surface and between the first and second side wall surfaces of the base, means fastening the cap to the base member, the cap and base defining a rear opening at the rear end, the cap defining a cap interface surface wherein the base interface surface and the cap interface surface define an elongated uninterrupted second slot open to the second side wall surface communicating with the rear opening and towards the front in a plane parallel but spaced from the first slot defined in the mound, whereby the fishing line is received by the first and second slot and the rear opening so that the retriever can slide by the weight of its mass on the fishing line when the line is taut; means at the front end being engaged by a retrieval cord, a latch in the rear opening pivotally mounted against a spring in the base, the latch including a handle and a fishing line engaging member, an opening in the cap to permit manual engagement of the handle to move the latch inwardly of the retriever against the spring between a closed position with the fishing line engaging member closing a portion of the second slot to trap the fishing line within the retriever and a second position wherein the fishing line engaging member is clear of the second slot to free the fishing line.

2. The fishing lure retriever as defined in claim 1 wherein the latch is set so that it can be depressed against the spring when the rear end of the retriever engages the leader of the lure to be retrieved, and the latch is adapted to snare the leader in the rear opening.

3. The fishing lure retriever as defined in claim 1 wherein the second slot between the base and the cap comprises a longitudinal component and a lateral component communicating with a longitudinal straight path for the fishing line, said path being interrupted by the latch such that the fishing line is first inserted through said second slot to then enter the straight line path and the latch is depressed to the second position to receive the fishing line.

* * * * *